3,510,394
PRODUCTION OF WATER-LAID FELTED MINERAL FIBER PANELS INCLUDING USE OF FLOCCULATING AGENT

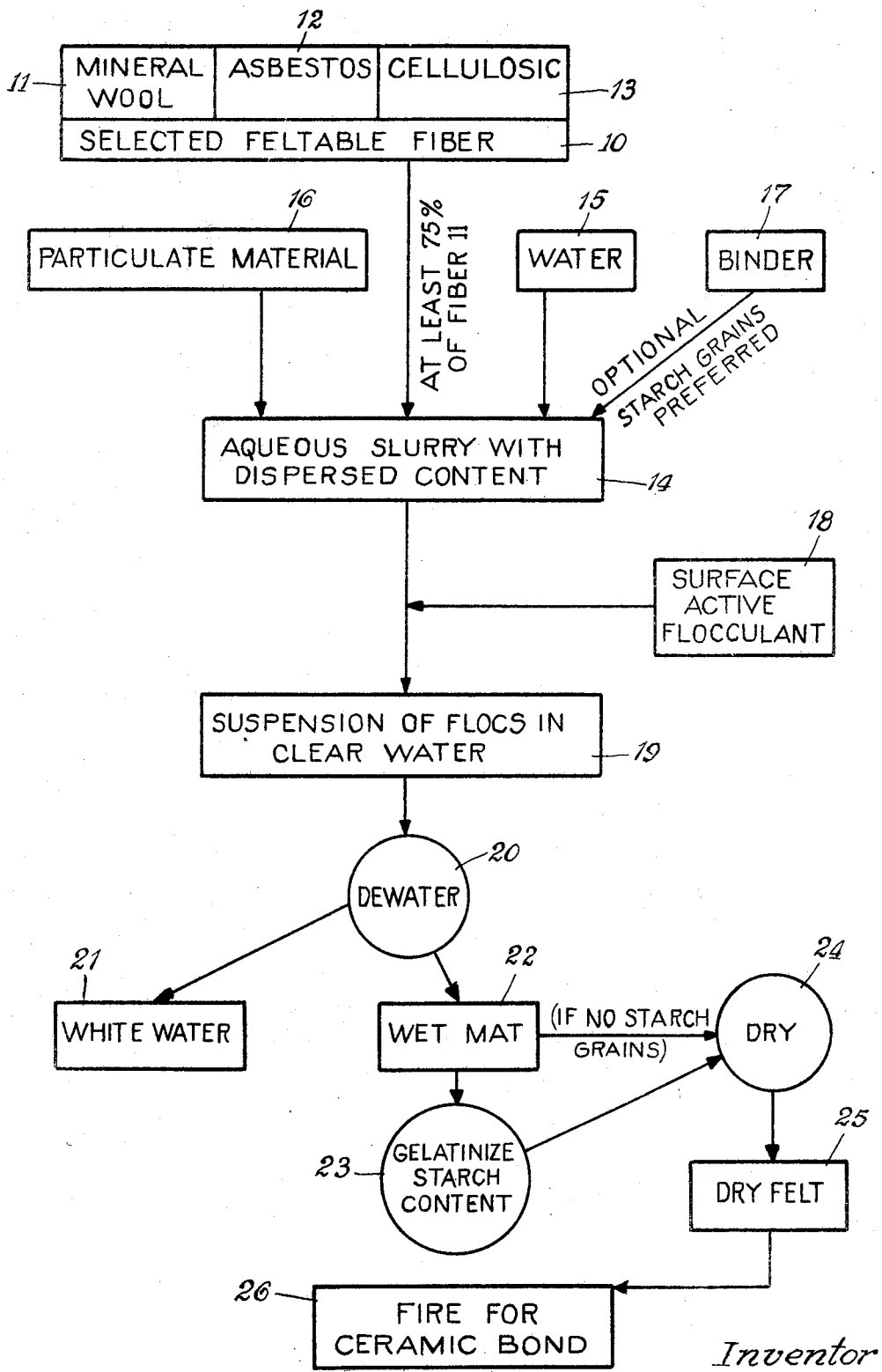

John E. Cadotte, St. Paul, Minn., assignor to Conwed Corporation, a corporation of Delaware
Continuation-in-part of applications Ser. No. 149,199, Nov. 1, 1961, and Ser. No. 193,299, May 8, 1962. This application Jan. 25, 1965, Ser. No. 427,545
Int. Cl. C04b *33/32;* D21f *11/04*
U.S. Cl. 162—145                        2 Claims The present invention is a continuation-in-part of Ser. No. 149,199, filed Nov. 1, 1961, and of Ser. No. 193,299, filed May 8, 1962 as a continuation-in-part of Ser. No. 149,199 both now abandoned.

In U.S. Pat. No. 3,093,533, a fire-retardant felted mineral fiber panel is described as made by dewatering on a screen a slurry of feltable fibers consisting essentially of synthetic mineral fibers, with a content of starch grains for binder, and a small amount of asbestos fibers. The starch grains are dispersible in water and a proportion thereof is lost through the screen in the dewatering. To minimize the loss the asbestos fibers are used to increase the viscosity of the slurry, but the content of asbestos fibers is limited so as to permit a drainage rate commercially satisfactory for dewatering the slurry in continuous felting apparatus, in particular a Fourdrinier machine. Because of the ease with which water dispersible particulate material is in part lost by such a process, it was not practicable or economical to include in the slurry particulate material such as kaolin clay.

The present invention is based upon the discovery that loss of water-dispersible particulate material in the slurry can be prevented by use of very small amounts of surface-active flocculating agents forming flocs in clear suspending water. Thus, it became practicable to suspend kaolin clay in the slurry and also to preserve all the starch thus using less in the slurry. To a degree, small amounts of such clay function in the dried felt as binder, thus permitting use of less starch grains and even its omission, depending upon ultimate use of the product.

Also, the present invention is based upon the discovery that a dry felted mineral fiber mat containing kaolin and having a wide range of densities, could be fired to produce a ceramic bond and ceramic products having varying degrees of porosity.

The foregoing discoveries have led to variations in the mineral fiber, in the particulate ceramic material, and in binder, and in particular to preferred use of binder so that strong handleable bonded fiber sheets may be made continuously, as on a Fourdrinier machine. Such sheets when dry can be cut into fireproof panels and tile, and in particular, to preforms to be fired. Such preforms can thus be produced in much larger sizes, and so fired, than by previous practices.

It is, therefore, the object of the invention to flocculate with a small quantity of a surface-active flocculating agent an aqueous slurry of feltable fibers consisting essentially of synthetic mineral fibers and a content of water-dispersible particulate ceramic material, and to form a wet felted fiber mat by screening the flocs from the clear suspending water, and drying the wet mat.

It is a further object of the invention to employ a particulate water-dispersible binder for the fibers.

It is a further object of the invention to fire a felted synthetic mineral fiber mat having distributed therein and carried thereby particulate ceramic material, to achieve various degrees of ceramic bonding between the fibers and the particulate material.

Various other and ancillary objects and advantages of the invention will become apparent from the following description and explanation of it by reference to numerous variations.

In the foregoing discussion, there is reference to forming fire-resistant mineral fiber panels. According to the present invention, such panels are improved in fire-resistance by incorporation of kaolin clay, such improvement being evident when from 10 to 30 parts of kaolin are used with 100 parts of mineral wool. Above 30 parts, the fire-resistance is not correspondingly improved, the panel tends to become weaker as the kaolin content is increased, the rate of dewatering the slurry is increased, and the dry-board density is increased with lowered acoustical properties.

For purposes other than forming fire-resistant panels, namely, for producing preform material to be fired, the kaolin may be used in amount such as 250 parts to 100 parts of the mineral fiber. For producing ceramic products, a variety of synthetic mineral fibers and of particulate ceramic materials may be employed.

In carrying out the invention, water-soluble organic surface-active flocculating agents may be used, such as polyacrylamide and others.

Such organic flocculants are effective in only small amounts in the slurry, to be determined experimentally. Excess over a flocculating quantity leads to redispersion of the flocs and is to be avoided. A preferred organic flocculant is a polymer of acrylamide described in U.S. Pat. No. 2,972,560, hereinafter referred to as polyacrylamide flocculant.

Among various organic flocculants, those of the present invention may be used in quantity about one-tenth of the quantity required for the others for the same effect. In consequence, the invention is illustrated generally by use of the polyacrylamide. Small amounts of certain water-soluble salts, for example, calcium chloride, enhance the effect of the flocculant, although it is not necessary.

Said Pat. No. 2,972,560 teaches that alum must be added to paper-making slurries of cellulosic fibers and clay in order to flocculate the slurry with polyacrylamide. The alum in some ways renders the cellulosic fibers subject to flocculation. The present invention is based on the discovery that synthetic mineral fibers, because of their metal content are directly subject to flocculation by polyacrylamide flocculant, in the presence or absence of clay or like particles. Some synthetic mineral fibers are inherently alkaline and are attacked by solutions having a pH substantially below pH of 7. For example, slag wool contains a small content of metal sulfides and a solution of alum releases hydrogen sulfide from slag wool.

When alum is used with polyacrylamide for flocculating slurries containing alkaline synthetic mineral fibers and particulate material, the drainage time of the resulting flocculated slurry is appreciably longer than when alum is not used, and is sufficiently slow to make it commercially impracticable to use the flocculated slurry on commercial continuous felting apparatus. The reason for this is not understood, but it appears to be related to the alkalinity of the fibers. This is evidenced by the fact that in comparable flocculations wherein the fibers are not alkaline, such as fibers spun from fused kaolin, and such as certain glass fibers, the drainage rate is substantially the same with or without alum used with polyacrylamide flocculant.

As a result, a slurry of alkaline synthetic mineral fibers and particulate material, such as clay, is preferably flocculated with polyacrylamide flocculant in the absence of any substantial content of acidic salts. However natural salts of monovalent metals are not detrimental to the drainage rate and may be tolerated, such as sodium chloride, sodium sulfate and the like. But, neutral to alkaline salts of polyvalent metals are detrimental except in trace quantities, which latter are beneficial when tighter flocs are desired. For example, calcium chloride may be used as disclosed hereinafter. When such neutral to alkaline polyvalent metal salts are used, and a mat is formed on a Fourdrinier machine, the resulting tighter flocs give a wet mat having less wet strength than is achieved in the absence of calcium chloride.

Among the neutral to alkaline salts which are permissibly usable, certain ones are excluded when they function additionally as dispersants, for example, as do sodium polyphosphates and sodium silicates.

Preferably the flocculation is effected just before the slurry is dewatered when using a continuous forming apparatus. The flocs or clumps of particulate material and starch grains are formed among the fibers and reside in substantially clear suspending water, easily drained as the fiber-containing flocs condense to a felted wet mat. The drained mat may be further dewatered by compression in degree controlled to effect a predetermined density of the wet mat. When starch granules provide the binder, the wet mat is heated to gelatinize the starch in situ before drying, and then the mat is dried thus yielding a handleable preform.

Although the description and examples teach the use of binder in making the preform, it is to be understood that binder is a practical requisite where large-sized preform sheets or bodies are formed. The binder in conjunction with the reinforcing primary network permits handling and firing much larger pieces than are conventionally used in the ceramic field. For small sizes binder may be dispensed with, especially where the composition without binder imparts integrity to the preform, as does dried clay impregnating the primary network.

The polyacrylamide is preferably added to the slurry as a dilute solution thereof, the following example serving for slurries having 100 parts of mineral wool and about 5,000 parts of water:

| | Parts |
|---|---|
| Polyacrylamide flocculant | 0.04 |
| Calcium chloride | 0.05 |
| Water | 40.0 |

The following examples show the use of but one particulate ceramic material, namely, kaolin clay, with various synthetic mineral fibers, namely, slag wool, mineral wool, K-wool and glass wool.

EXAMPLE 1

A slurry was made, flocculated, dewatered to a wet mat in which the starch was gelatinized before drying the mat. Then pieces of the mat were fired as indicated.

| | Parts by wt. |
|---|---|
| Slag wool (white) | 100 |
| Kaolin clay | 250 |
| Calcium chloride | 0.5 |
| Tapioca starch | 5.0 |
| Polyacrylamide flocculant | 0.16 |
| Water | 3700 |

The slurry was dewatered by drainage and compression and the mat dried.

The dried mat

Thickness—.595 inch.
Density—86 lbs./cu. ft.

Preform fired at 2000° F.

| Shrinkage: | Percent |
|---|---|
| Thickness | 2.5 |
| Area dimensions | 1.5 |

Density—86 lbs./cu. ft.
Modulus of rupture—(Too hard to cut)

The unchanged density accompanied by shrinkage reflects the dehydration of the clay.

EXAMPLE 2

A different flocculant is used:

| | Parts by wt. |
|---|---|
| White slag wool | 100 |
| Kaolin clay | 100 |
| Calcium chloride | 0.5 |
| Polyvinyl alcohol (powder) | 5 |
| Flocculant [1] | 0.06 |
| Water | 3700 |

[1] A copolymer of methyl vinyl ether and maleic anhydride ("Gantrez A.N. 169" of General Aniline and Film Corporation of New York, N.Y.) which was dissolved 1 part in 100 parts of aqueous ammonium hydroxide solution containing 0.28% ammonia.

The dried mat

Thickness—.620 inch.
Density—47 lbs./cu. ft.

Preform fired at 2000° F.

| Shrinkage: | Percent |
|---|---|
| Thickness | 3.3 |
| Area dimensions | 1.5 |

Modulus of rupture—212 lbs./sq. in.

EXAMPLE 3

A fiber from spun fused kaolin, known as K-wool, is employed.

| | Parts by wt. |
|---|---|
| K-wool (spun from fused kaolin) | 100 |
| Kaolin clay | 10 |
| Calcium chloride | 0.5 |
| Tapioca starch | 10 |
| Polyacrylamide flocculant | 0.08 |
| Water | 7400 |

The dried mat

Thickness—0.870 inch
Density—19.5 lbs./cu. ft.

Preform fired at 2000° F.

| Shrinkage: | Percent |
|---|---|
| Thickness | 4.6 |
| Area dimensions | 1.5 |

Density—30 lbs./cu. ft.
Modulus of rupture—67 lbs./sq. in.

The K-wool remains as fiber in the presence of the fluxed clay, giving a fiber-reinforced ceramic, in the form of a mineral felt bonded by fired clay.

EXAMPLE 4

Glass wool is employed.

| | Parts by wt. |
|---|---|
| Glass wool | 100 |
| Kaolin clay | 100 |
| Starch grains | 10 |
| Polyacrylamide flocculant | 0.04 |
| Calcium chloride | 1.0 |
| Water | 6000 |

The dried mat

Thickness—0.882 inch
Density—33 lbs./cu. ft.

Preform fired at 1420° F.

| Shrinkage: | Percent |
|---|---|
| Thickness | 6.4 |
| Area dimensions | 0.4 |

Density—32.7 lbs./cu. ft.
Modulus of rupture—178 lbs./sq. in.

The following examples show the use of one kind of particulate ceramic material other than kaolin, and also illustrate use of polyacrylamide without calcium chloride.

EXAMPLE 5

A fixed formulation for a slurry except for variation in clay was employed as follows:

| | Parts by wt. |
|---|---|
| White slag wool | 100 |
| Clay (see table below) | |
| Starch grains | 5 |
| Water | 3000 |
| Polyacrylamide flocculant | .04 |

A starch bonded preform was made as described above by filtering the flocculated slurry. The drainage rate was measured for the particular apparatus, and as reported below, is comparative only. The density of the preform is reported before firing at about 2000° F. The shrinkage in area dimensions (length and width) during firing, and the modulus of rupture (M/R) of the finished ceramic body are reported, all in the following Table I.

TABLE I

| Ex. | Clay | X parts | Drain rate in seconds | Density, lbs./cu. ft. | After firing Shrinkage, percent | After firing M/R,[1] lbs./sq. in. |
|---|---|---|---|---|---|---|
| 5a | Attapulgite | 50 | 36.8 | 36.8 | 16.6 | 620 |
| 5b | do | 100 | 37.5 | 47 | 14.5 | 1,010 |
| 5c | Calcium bentonite | 50 | 27 | 39 | 4 | 198 |
| 5d | do | 100 | 100 | 54 | 2 | |

[1] Based on preform dimensions.

The following examples show the use of mixtures of particulate ceramic materials.

EXAMPLE 6

| | Parts by wt. |
|---|---|
| White slag wool | 100 |
| Kaolin clay | 50 |
| Ground felspar | 50 |
| Tapioca starch grains | 10 |
| Water | 3700 |
| Polyacrylamide flocculant | 0.08 |
| Calcium chloride | 0.5 |

The dried mat

Density—48 lbs./cu. ft.

Preform fired at 2000° F.

| Shrinkage: | Percent |
|---|---|
| Thickness | 0.3 |
| Area dimensions | 0.8 |

Modulus of rupture—167 lbs./sq. in.

EXAMPLE 7

In Example 6, the felspar was replaced by 100-mesh kyanite, producing a preform of 48 lbs./cu. ft.

Preform fired at 2000° F.

| Shrinkage: | Percent |
|---|---|
| Thickness | None |
| Area dimensions | 0.8% |

Modulus of rupture—167 lbs./sq. in.

EXAMPLE 8

| | Parts by wt. |
|---|---|
| White slag wool | 100 |
| Kaolin | 100 |
| Pulverized white slag wool | 100 |
| Starch grains | 5 |
| Water | 3000 |
| Polyacrylamide flocculant | 0.04 |
| Calcium chloride | 1.0 |

The dried mat

Thickness—0.584 inch
Density—73.5 lbs./cu. ft.

Preform fired at 2000° F.

| Shrinkage: | Percent |
|---|---|
| Thickness | 1.5 |

Density—7.5 lbs./cu. ft.
Modulus of rupture—(Too hard to saw).

EXAMPLE 9

| | Parts by wt. |
|---|---|
| White slag wool | 100 |
| Kaolin clay | 50 |
| Calcium bentonite | 50 |
| Starch grains | 5 |
| Water | 3000 |
| Polyacrylamide flocculant | 0.04 |
| Calcium chloride | 1.0 |

The dried mat

Thickness—.551 inch.
Density—50.5 lbs./cu. ft.

Preform fired at 2000° F.

| Shrinkage: | Percent |
|---|---|
| Thickness | None |
| Area dimensions | 1.6% |

Density—46.2 lbs./cu. ft.
Modulus of rupture—390 lbs./sq. in.

EXAMPLE 10

| | Parts by wt. |
|---|---|
| White slag wool | 100 |
| Kaolin clay | 50 |
| Attapulgite clay | 50 |
| Starch grains | 5 |
| Water | 3000 |
| Polyacrylamide flocculant | 0.04 |
| Calcium chloride | 1.0 |

The dried mat

Thickness—.569 inch
Density—49.5 lbs./cu. ft.

Preform fired at 2000° F.

| Shrinkage: | Percent |
|---|---|
| Thickness | 4 |
| Area dimensions | 3.1 |

Density—48.6 lbs./cu. ft.
Modulus of rupture—410 lbs./sq. in.

EXAMPLE 11

| | Parts by wt. |
|---|---|
| White slag wool | 100 |
| Kaolin clay | 100 |
| Lead oxide (PbO) | 25 |
| Starch grains | 5 |
| Water | 3000 |
| Polyacrylamide flocculant | 0.04 |
| Calcium chloride | 1.0 |

The dried mat

Thickness—.526 inch.
Density—63 lbs./cu. ft.

Preform fired at 2000° F.

| Shrinkage: | Percent |
|---|---|
| Thickness | 5.2 |
| Area dimensions | 5.5 |

Density—61.5 lbs./cu. ft.
Modulus of rupture—502 lbs./sq. in.

The following examples show the use of binder other than starch and not necessarily in the slurry.

EXAMPLE 12

| | Parts by wt. |
|---|---|
| White slag wool | 100 |
| Kaolin clay | 100 |
| Water | 3700 |
| Polyacrylamide flocculant | 0.08 |
| Calcium chloride | 0.5 |

No binder is present in the above slurry. After dewatering the pressed mat was impregnated with a solution of 20 parts of sodium silicate in 80 parts of water. On drying, sodium silicate migrated to the surface of the dried body, which nevertheless had adequate strength at a density of 51.5 lbs. per cu. ft. The preform was fired at 2000° F. with a linear shrinkage of 0.8% to 1.6% and no shrinkage in thickness. Modulus of rupture was 281 lbs. per sq. in.

EXAMPLE 13

| | Parts by wt. |
|---|---|
| White slag wool | 100 |
| Kaolin clay | 100 |
| Calcium chloride | 0.5 |
| Animal glue (dry solids) | 5 |
| Polyacrylamide flocculant | 0.08 |
| Water | 3700 |

The dried mat

Thickness—.575 inch
Density—49.7 lbs./cu. ft.

Preform fired at 2000° F.

| Shrinkage: | Percent |
|---|---|
| Thickness | 1.8 |
| Area dimensions | 1.5 |

Density—49.7 lbs./cu. ft.
Modulus of rupture—282 lbs./sq. in.

EXAMPLE 14

In the composition of Example 13, the animal glue was changed weight for weight to polyvinyl alcohol powder.

The dried mat

Thickness—.620 inch
Density—47 lbs./cu. ft.

Preform fired at 2000° F.

| Shrinkage: | Percent |
|---|---|
| Thickness | 3.3 |
| Area dimensions | 1.5 |

Modulus of rupture—212 lbs./sq. in

As stated above, the invention has developed from experience with the process of U.S. Pat. No. 3,093,533, which gives a range of formulations for dewatered unflocculated slurries as follows:

TABLE II

| | Parts by wt. |
|---|---|
| Feltable fibers | 77–100 |
| Mineral fibers | 77–90 |
| Synthetic mineral fibers | 75–88 |
| Asbestos | 2–15 |
| Cellulosic fibers | 0–10 |
| Starch grains | 5–20 |

In the above the "feltable fibers" content includes all the mineral fibers and any cellulosic fibers, and the "mineral fibers" content includes all the synthetic mineral fibers and all the asbestos fibers.

In said formulation, the asbestos fibers function to thicken a slurry for felting so that the drainage rate is such as to conserve at least 80% of the starch grains. By use of the present invention, slurries of the same formulation may be augmented by adding particulate material in a wide range of proportions, as evidenced by the foregoing examples, when flocculation is practiced. Asbestos is used in Table II above to thicken the slurry to enhance retention of starch. It may be omitted when flocculation is practiced, especially with added clay. Also, because of the flocculation, the starch content may be reduced.

EXAMPLE 15

Any formulation within Table II with less starch and with or without asbestos, and having:

| | Parts by wt. |
|---|---|
| Feltable fibers | 100 |
| Starch grains | 1 |
| Kaolin clay | 30 |
| Polyacrylamide flocculant | .08 |
| Water | 3700 |

The slurry is dewatered, the starch gelatinized in situ and the wet mat dried to a thickness of about .68 inch and a density of 20 pounds per cu. ft.

The process above described and illustrated is set forth in the accompanying drawing in which a flow sheet is shown with materials generically indicated.

In the drawing numeral 10 represents selected feltable fibers, which may be all synthetic mineral fiber 11, such as mineral wool, or at least 75% of such fiber mixed with asbestos 12 or cellulosic fiber 13, or both, as above exemplified. A slurry 14 in water 15 containing such fibers also contains dispersed particulate material 16, preferably kaolin, and optional binder 17, preferably starch grains. Dispersed kaolin and starch grains exemplify material which can be lost through a filtering screen in forming a felt.

Numeral 18 represents addition of a surface-active flocculant to the slurry 14, to form a suspension 19 of flocs in clear water. The floc suspension is dewatered at 20, giving a clear white water 21 and a wet mat 22. When the wet mat contains starch grains, the latter are gelatinized by heat at 23 in the wet mat which is then dried at 24 to form a dry felt 25. When no binder or certain other types of binders are used, the wet mat 22 may be dried directly at 24. Numeral 26 indicates a firing step to achieve a ceramic bond.

It will be seen from the above examples that the compositions for ceramic preforms are not limited to clays and slag wool. Other synthetic mineral fibers may be used, such as those from fused alumina, or silica, or zircon, or zirconium dioxide, or oxides of other metals. Among other particulate ceramic materials are burned clays, powdered ceramic waste, mineral silicates anhydrous and hydrated. Small amounts of organic material, aside from the starch, such as cellulosic fibers, may be included, which can be burned out in firing to control porosity.

Because of the variety of materials which may be used, the unfired product is claimed herein as the product of the process. Because the structure of the fired product may vary with the materials and the firing temperature the fired product is claimed as the product of the process. It is to be appreciated that the presence of the binder in the process can lead to very large sizes of fired product.

In the examples the amounts of polyacrylamide used, based on 100 parts of suspended solids of the slurry is a minimum of 0.013 part in Example 8 to a maximum of 0.073 part in Example 2.

Examples 5 and 15 show no use of calcium chloride and Example 8 shows the maximum use of 1 part per 100 parts of suspended solids. The small amount of salt may be present in the slurry when the flocculant is added, or it may be added with the flocculant as a solution of the two.

From the foregoing it will be appreciated that the invention is not limited to and by the foregoing examples, and that numerous variations are contemplated as falling within the scope of the appended claims.

I claim:

1. The method comprising making a slurry consisting essentially of water, 100 parts of feltable fiber which consist essentially of mineral fiber of which at least 83.3% by weight is synthetic mineral fiber, from 10 to 250 parts of water-dispersible particulate ceramic material, and particulate organic heat-activatable binder, flocculating the slurry by adding a surface-active flocculating agent and thereby forming flocs suspended in substantially clear water, the amount of said surface-active agent being in the range from .013% to .073% of the dry weight of the suspended content of the slurry, dewatering the resulting suspension of flocs and thereby forming a wet mat of solids consisting essentially of a felted network and said feltable fibers and distributed in and carried thereby said particulate materials, activating the binder by heat and forming a rigid handleable bonded porous dry mat by drying the wet mat, and firing at least a piece of said dry mat at a temperature sufficient to burn out organic matter and to achieve ceramic bonding throughout the fired piece.

2. The method comprising making a slurry consisting essentially of water, 100 parts of feltable fiber of which at least 75% are synthetic mineral fibers, from 10 to 250 parts of water-dispersible particulate ceramic material, and starch grains for binder, flocculating the slurry by adding a surface-active flocculating agent and thereby forming flocs suspended in substantially clear water, the amount of said surface-active agent being in the range from .013 to .073% of the dry weight of the suspended content of the slurry, dewatering the resulting suspension of flocs and thereby forming a wet mat of solids consisting essentially of a felted network of said feltable fibers and distributed in and carried thereby said particulate ceramic material and said starch grains, gelatinizing the starch in the wet mat, and forming a rigid handleable bonded porous dry mat by drying the resulting wet mat.

References Cited

UNITED STATES PATENTS

| | | | |
|---|---|---|---|
| 3,066,066 | 11/1962 | Keim | 162—152 |
| 3,136,683 | 6/1964 | Denlinger | 162—152 |
| 3,184,372 | 5/1965 | Cotts | 162—145 |
| 2,063,102 | 12/1936 | Jones | 106—41 |
| 2,962,415 | 11/1960 | Arledter | 162—145 |
| 3,014,835 | 12/1961 | Feigley | 162—154 |
| 3,017,318 | 1/1962 | Labino | 162—152 |
| 3,076,740 | 2/1963 | Reynolds | 162—155 |
| 3,093,533 | 6/1963 | Hella | 162—145 |

DONALD J. ARNOLD, Primary Examiner

U.C. Cl. X.R.

106—39, 40, 41; 162—152, 153, 155; 264—56